US005450917A

United States Patent [19]
Goddard

[11] Patent Number: 5,450,917
[45] Date of Patent: Sep. 19, 1995

[54] CAB WINDOW WITH ACCESS FEATURE FOR EXTERNAL CONTROLS

[76] Inventor: Roger W. Goddard, Clanver End Farm, Wendens Ambo, Saffron Walden, Essex CB11 4UL, England

[21] Appl. No.: 287,551

[22] Filed: Aug. 8, 1994

[30] Foreign Application Priority Data

Aug. 18, 1993 [GB] United Kingdom ............... 9317191

[51] Int. Cl.6 .................... B60J 1/18; B62D 33/06
[52] U.S. Cl. .................. 180/89.12; 296/190; 296/146.16; 49/463
[58] Field of Search ............ 180/89.12, 89.1; 296/190, 146.16, 201, 208; 49/463

[56] References Cited

U.S. PATENT DOCUMENTS

| | | | |
|---|---|---|---|
| 2,565,919 | 8/1951 | Hill | 296/190 |
| 3,414,316 | 12/1968 | Williams et al. | 296/190 |
| 3,967,859 | 7/1976 | Whisler | 180/89.12 |
| 4,518,195 | 5/1985 | Tindall et al. | 296/190 |
| 5,076,635 | 12/1991 | Larkin et al. | 296/190 |

FOREIGN PATENT DOCUMENTS

| | | | |
|---|---|---|---|
| 2418259 | 11/1975 | Germany | 296/190 |
| 0182520 | 11/1982 | Japan | 296/146.16 |
| 0191626 | 11/1983 | Japan | 296/146.16 |
| 0173719 | 7/1988 | Japan | 296/190 |

Primary Examiner—Margaret A. Focarino
Assistant Examiner—Peter C. English
Attorney, Agent, or Firm—Larry W. Miller; Frank A. Seemar

[57] ABSTRACT

An agricultural tractor is disclosed wherein a base frame and an operator's cab mounted on the base frame includes a wall having a passage which is normally sealed with a removable window panel. The panel has a generally rectangular shape, except for a triangular cut-out in one of its corners. In one position of the panel, the cut-out is covered whereas in another position the cut-out is uncovered so as to form an aperture for accommodating the passage of a control cable for the remote operation of external equipment through the cab wall.

12 Claims, 3 Drawing Sheets

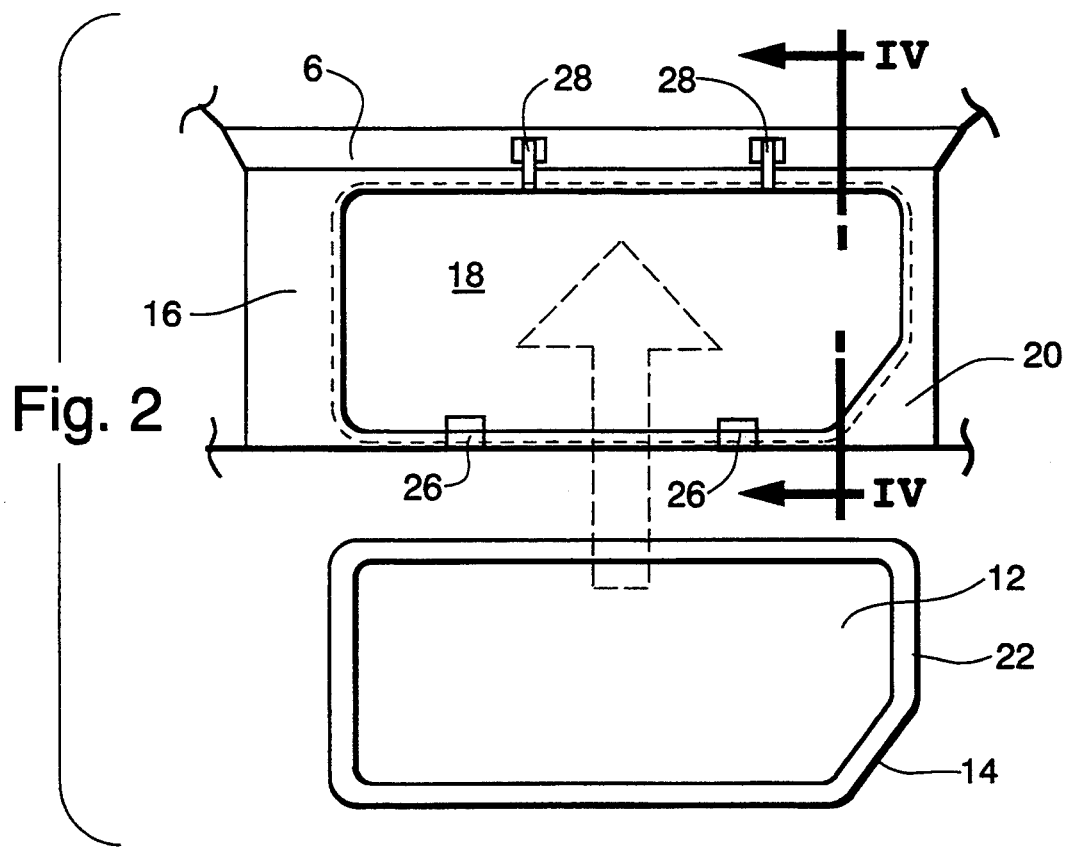
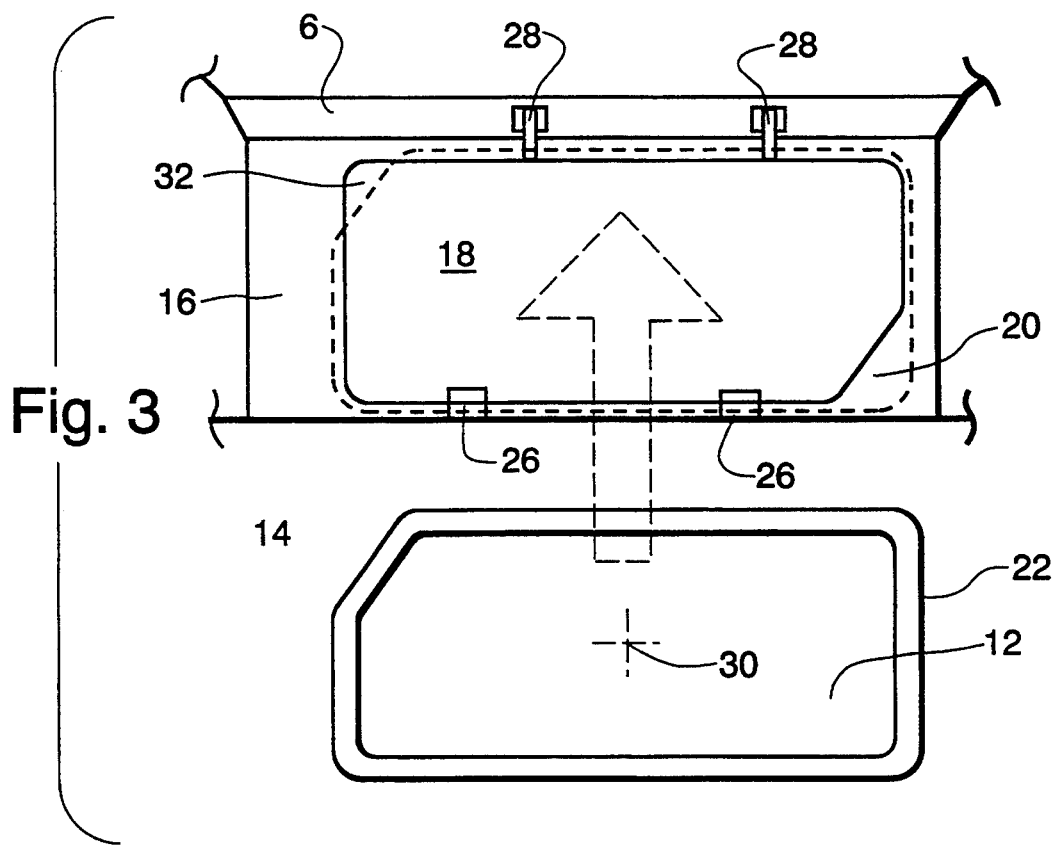

CAB WINDOW WITH ACCESS FEATURE FOR EXTERNAL CONTROLS

BACKGROUND OF THE INVENTION

The present invention relates to wired remote control of equipment and/or implements carried by or towed behind a vehicle, and more particularly to an access feature for introducing a control cable from the implement into the operator's cab. The invention has been conceived in relation to an agricultural tractor but it is to be understood that the invention is applicable to any vehicle or even static arrangement having a cab or enclosure and requiring the use of remote control cables.

Presently, external equipment carried by an agricultural tractor or agricultural implements, such as balers or pull-type forage harvesters, hitched by a tractor, commonly comprise components which have to be remotely controlled by means of a control box installed on the tractor's operator station. Especially with tractors provided with cabs enclosing the operator station, some difficulties are experienced to pass the control cable, leading from the control box to the remotely controlled implement or equipment, through the cab structure.

In this connection, it is a common practice to provide the rear wall of the cab with an aperture, of small dimensions, to allow the control cable to enter the cab therethrough. When no control cables are employed, the aperture commonly is sealed with a removable panel member. However, in as much as control boxes normally are relatively large, it is impossible to pass them through the small aperture in the cab structure and therefore, each time a control box is installed or removed from the operator's station, the connecting cables have to be disconnected from the box, which is a cumbersome and time-consuming operation, if at all possible, since some types of control boxes are not fitted with a breakable form of connection.

Of course, to overcome the above disadvantage, it is possible to provide an access passage of larger dimensions, through which any control box of standardized dimensions freely could be entered into the cab without difficulty. It will be appreciated however that, with such an arrangement and due to the fact that the passage should remain open during the operation of the machine as a result of the control cable passing therethrough, the large, uncovered opening in the cab would be detrimental to the sound proofing thereof and further adversely would affect the air conditioning within the cab. Moreover, the ingress of dirt and dust, or eventually chemicals, would be permitted; all the foregoing being unacceptable.

SUMMARY OF THE INVENTION

It is, therefore, the objective of the present invention to overcome the shortcomings and drawbacks of heretofore employed passages for entering remote control cables into a tractor cab. More specifically, it is the objective to provide a passage allowing control boxes to be installed into the cab without first requiring a disconnection thereof from the control cables and, nonetheless, without significantly or adversely affecting the sealing capacities of the cab.

According to a first aspect of the invention, a movable or static arrangement is provided comprising an operator's station surrounded by an enclosure or cab and including at least one wall having an aperture through which a control cable for the remote operation of external equipment means may enter the cab, the aperture being defined between a removable cab panel and an associated mount.

Preferably, the removable cab panel is formed by a transparent window panel having a basically rectangular shape, except for a triangular cut-out in one of its corners. In one position of the cab panel, the cut-out is blanked-off or covered, whereas in another position the cut-out is uncovered so as to form the aperture for accommodating the passage of the control cable through the cab wall.

The invention most conveniently is applicable to an agricultural tractor carrying or towing an external implement.

According to a second aspect of the invention, a method is provided for guiding a control cable for the remote operation of external equipment means through a wall of a cab, the wall comprising a removable cab panel being mounted therein in a first position. The method includes the steps of removing the cab panel to create a passage, introducing the control cable through the passage into the cab, and re-installing the cab panel in a second position.

These and other objects, features, and advantages are accomplished according to the instant invention by providing an agricultural tractor having a base frame and an operator's cab mounted on the base frame, and including a wall having a passage which is normally sealed with a removable window panel. The panel has a generally rectangular shape, except for a triangular cut-out in one of its corners. In one position of the panel, the cut-out is covered whereas in another position the cut-out is uncovered so as to form an aperture for accommodating the passage of a control cable for the remote operation of external equipment through the cab wall.

BRIEF DESCRIPTION OF THE DRAWINGS

A vehicle in accordance with the present invention will now be described in greater detail, by way of example, with reference to the accompanying drawings, wherein:

FIG. 2 is a detailed view of a curtailed portion of the cab structure, as seen from the inside, showing a removable cab panel in a first position;

FIG. 3 is a view comparable to FIG. 2 but showing the removable cab panel in a second position.

DETAILED DESCRIPTION OF THE PREFERRED EMBODIMENT

In the following description right hand and left hand references are determined by standing at the rear of the tractor facing in a direction of forward travel. Also, in the following description, it is to be understood that terms such as "forward", "rearward", "upward", etc., are words of convenience and are not to be construed as limiting terms.

Figure 1:
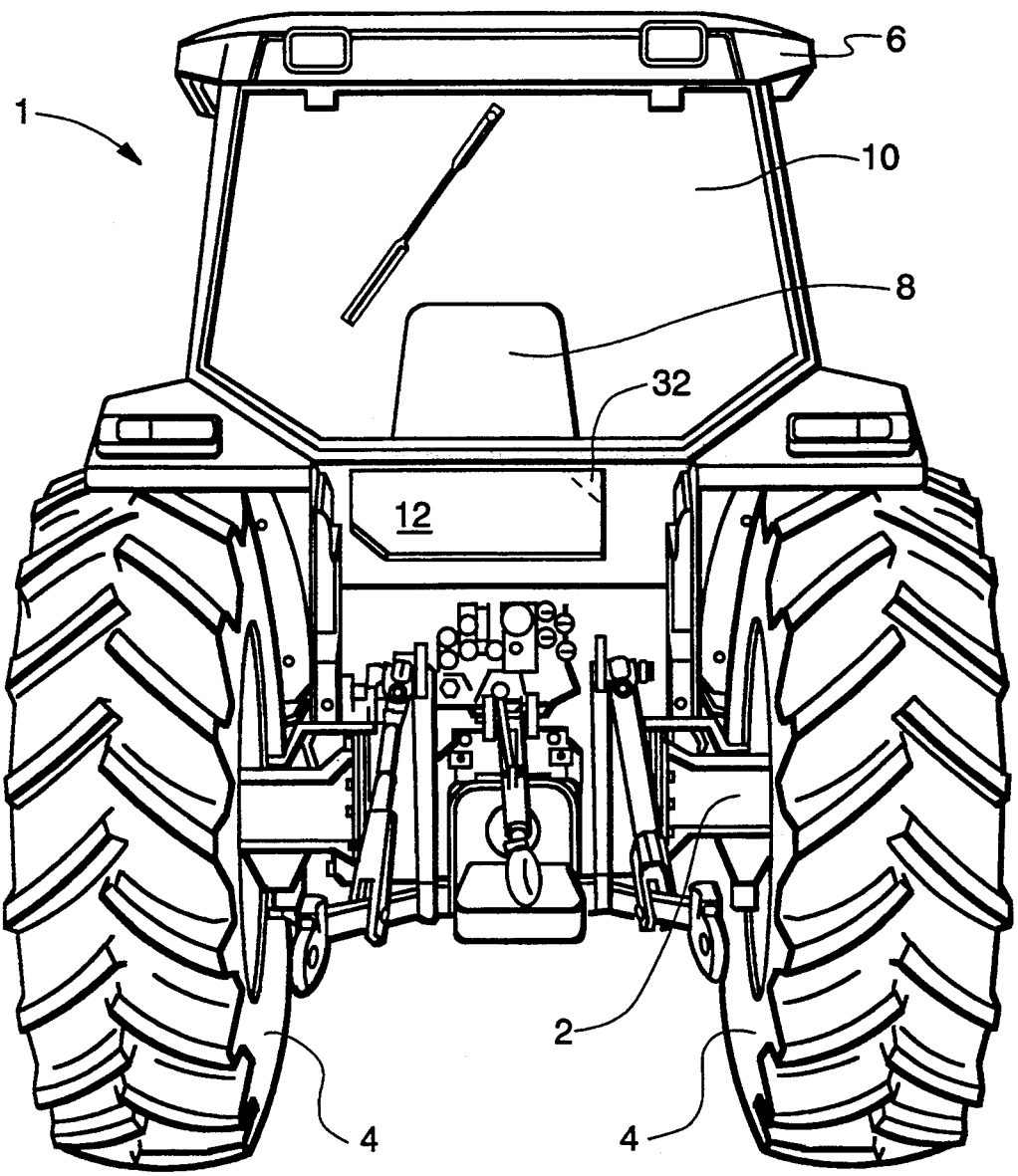
FIG. 1 is a rear view of a tractor including a cab incorporating the subject of the present invention.

Referring to FIG. 1, a tractor 1, illustrated from the rear, comprises a base structure or frame 2 movably supported over the ground by a pair of drivable rear wheels 4 and a pair of front steerable wheels (not shown). On top of the base structure 2, a cab 6 is provided which surrounds and encloses an operator station 8 to thereby enhance the comfort of the tractor operator as regards noise and air conditioning. The rear side of the cab 6 includes a large rear window 10, which selectively can be set in an open position, and a smaller window panel 12, which is provided in a lower portion of the cab structure close to the cab floor (not shown) and is normally held in a closed condition.

Figure 4:
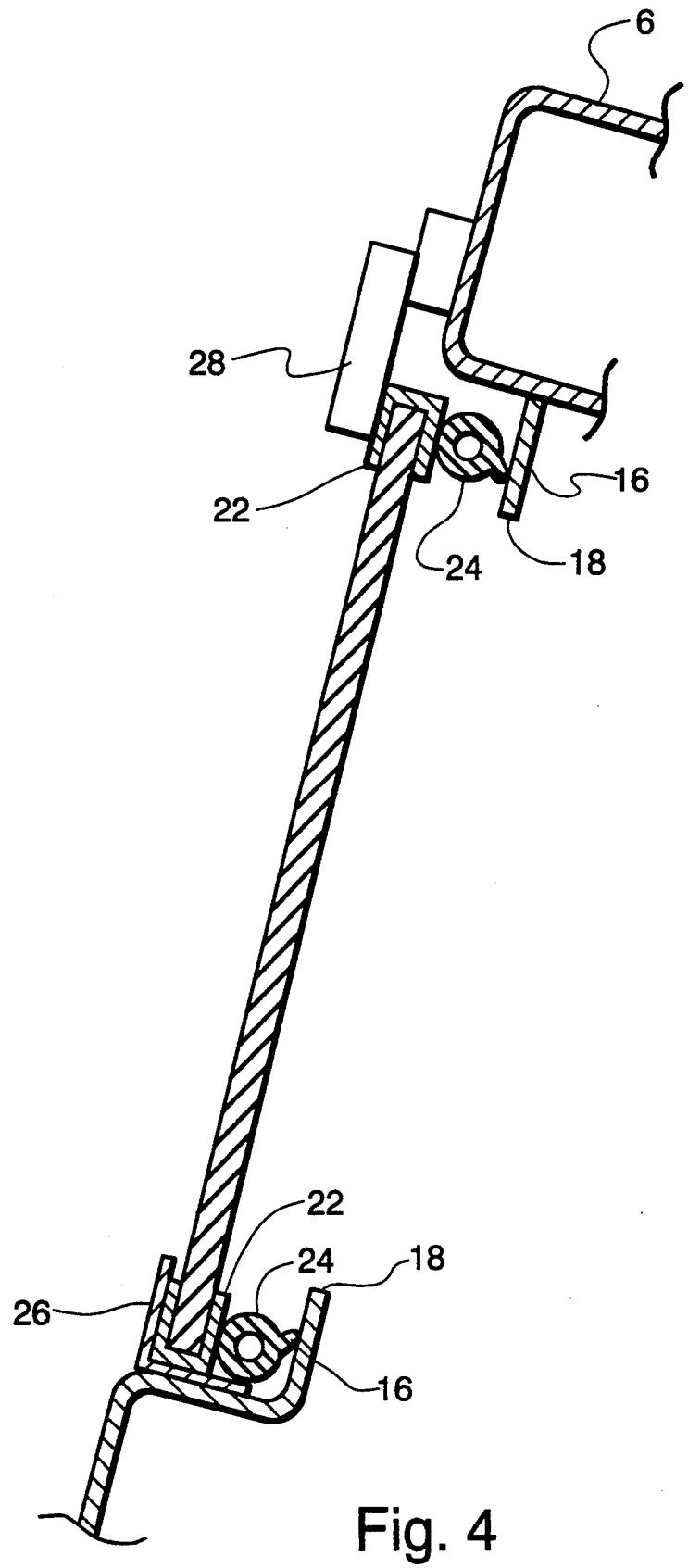
FIG. 4 is a cross sectional view of the removable cab panel and the associated mount taken along line IV—IV in FIG. 2.

As best seen in FIGS. 2 and 3, which are interior views of the rear lower portion of the cab structure, the window panel 12 has a mainly rectangular shape except for a triangular cut-out 14 provided at one of the corners. Referring equally to FIG. 4, the window panel 12 is supported by a mount 16, defining a passage 18 in the cab structure, of which the shape is also mainly rectangular, except for a gusset 20 incorporated at a lower corner. A weather strip 22 completely encompasses the window panel 12, which, in the closed condition, is held against a sealing strip 24 by intermediary of a pair of retainer elements 26 and a pair of latches 28.

From the dashed line position of the window panel 12 as shown in FIG. 2, it will be appreciated that the shape of said panel 12 and the passage 18 correspond to each other whereby the panel 12 slightly extends over the edges of the passage 18. Considering that the cut-out 14 of the panel 12 is covered or blanked off by the gusset 20 of the mount 16, the passage 18 is completely sealed when the panel 12 is mounted in the position shown in FIG. 2.

In FIG. 3, the window panel 12 has been turned through 180° around its central, orthogonal axis, indicated at 30, whereby the cut-out 14 is now positioned in the diametrically opposite corner relative to the gusset 20. It readily will be understood that, in this position of the window panel 12, a triangular aperture 32 is created in between the panel 12 and the mount 16; the location of this aperture 32 equally being indicated in FIG. 1 by means of a dashed line.

When no remote control cables for external equipment or implements have to be fitted, the window panel 12 normally is installed in the position shown in FIG. 2 so as to seal the passage 18 completely, as already explained. Contrary thereto however, to facilitate the provision of a control box in the cab without disconnecting the control cables therefrom, the following procedure is ensued. Starting from the condition of FIG. 2, the window panel 12 first of all is removed from its mount 16, whereafter a control box with a conventional associated control cable (not shown) is entered into the cab through the passage 18. Subsequently, the panel 12 is turned over 180° around the axis 30 and is re-installed in the mount 16 in the position shown in FIG. 3 whereby the control cable is allowed to occupy the space provided by the aperture 32 in the upper corner of the panel 12. If required, a suitable grommet may be provided to seal the remainder of the aperture 32 around the control cable completely. Naturally, to remove the control box from the cab, a reverse procedure is followed.

One skilled in the art will readily appreciate that the present invention is not restricted to the use of a transparent window panel but equally is applicable to any other removable cab panel. Such a panel may be provided in one or both of the side walls of the cab or even in the front wall thereof to allow the entrance of one or more control cables from whatever direction. The invention further is not limited to cab panels having a rectangular shape. Any other form is equally well acceptable provided that the panel has an irregularity, such as a cut-out, in an otherwise mainly regular shape which cooperates with a corresponding irregularity in the shape of an associated mount, so that, on the one hand, when the irregularity in the panel is blanked off by the irregularity in the mount, the panel completely seals the passage in the cab structure, and, on the other hand, when the irregularity in the panel is shifted away from the corresponding irregularity in the mount, an aperture is created in between the panel and the mount to allow a control cable to enter the cab.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a chassis; and an operator's station mounted on said chassis and being surrounded by a cab including at least one wall having an aperture therethrough for the passage of a control cable for the remote operation of external equipment into said cab, the improvement comprising:

said at least one wall having a passage therethrough defined by a mount and a removable cab panel supported on said mount to cover the passage through said at least one wall, said aperture being defined between said removable cab panel and said mount, said removable cab panel including a cut-out portion, said mount including a gusset at one corner thereof to define an irregularity in the shape of said passage.

2. The tractor of claim 1 wherein said panel is movable between a first position in which said cut-out is covered by said gusset, such that the passage is completely sealed by the panel, and a second position in which said cut-out and said gusset are shifted relative to each other to open said aperture.

3. The tractor of claim 2 wherein the movement of said panel from said first position to said second position is accomplished by turning said panel through an angle of approximately 180° around a central axis oriented perpendicularly to the surface of said panel.

4. The tractor of claim 3 wherein the shape of said mount corresponds to the shape of said panel, said cut-out defining an irregularity in an otherwise regular shape of said cab panel.

5. The tractor of claim 4 wherein said cab panel has a generally rectangular shape and said cut-out has a generally triangular shape.

6. The tractor of claim 5 wherein said removable cab panel is formed by a transparent window panel having weather strip means being tightly-fitted against said mount.

7. A method for guiding a control cable for the remote operation of an implement through a wall of a tractor cab enclosing an operator's station; said wall including a removable cab panel being orientable between first and second positions, comprising the steps of:

removing said cab panel from said first position to create a passage through said wall;

introducing said control cable into the cab through said passage; and re-installing said cab panel into said wall in said second position.

8. The method of claim 7 further comprising the step of rotating said cab panel through an angle of approximately 180° around a central axis oriented perpendicularly to the surface of said panel to re-orient said cab panel between said first and second positions.

9. The method of claim 7 said introducing step further includes the step of passing a control box connected to said control cable through the passage in said cab wall.

10. The method of claim 9 wherein said removable cab panel has a generally rectangular shape and includes a cut-out, said method further comprising the steps of:

associating the cut-out in the cab panel with a gusset when said cab panel is oriented in said first position to seal the passage completely; and uncovering said cut-out when said cab panel is positioned in said second position to create an aperture to accommodate the passage of said control cable through said cab wall.

11. A tractor comprising:

a wheeled chassis adapted for movement over the ground;

an operator's station mounted on said chassis from which an operator may control the operation of said tractor;

a cab enclosing said operator's station and including at least one wall having a removable cab panel and an associated gusset defining an aperture through said at least one wall for the passage of a control cable for the remote operation of external equipment connected to said tractor into said cab; and said removable cab panel including a cut-out portion and being selectively movable between a first position in which said cut-out is covered by said gusset, such that said aperture is completely sealed by said cab panel, and a second position in which said cut-out and said gusset are shifted relative to each other to open said aperture.

12. The tractor of claim 11 wherein the movement of said panel between said first position and said second position is accomplished by rotating said panel through an angle of approximately 180° around a central axis oriented perpendicularly to the surface of said panel.

* * * * *